(12) United States Patent
Kanehara et al.

(10) Patent No.: US 11,778,316 B2
(45) Date of Patent: Oct. 3, 2023

(54) IMAGING APPARATUS

(71) Applicant: HONDA MOTOR CO., LTD., Tokyo (JP)

(72) Inventors: Akira Kanehara, Wako (JP); Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/553,289

(22) Filed: Dec. 16, 2021

(65) Prior Publication Data
US 2022/0210327 A1 Jun. 30, 2022

(30) Foreign Application Priority Data

Dec. 25, 2020 (JP) ................. 2020-217313

(51) Int. Cl.
*H04N 23/667* (2023.01)
*G06V 10/147* (2022.01)
*G06V 20/56* (2022.01)
*G06V 20/59* (2022.01)
*G06V 10/26* (2022.01)
*G06V 40/16* (2022.01)
*H04N 23/10* (2023.01)
*H04N 23/67* (2023.01)
*B60R 11/04* (2006.01)
*B60R 11/00* (2006.01)

(52) U.S. Cl.
CPC ......... *H04N 23/667* (2023.01); *G06V 10/147* (2022.01); *G06V 10/267* (2022.01); *G06V 10/273* (2022.01); *G06V 20/56* (2022.01); *G06V 20/59* (2022.01); *G06V 40/16* (2022.01); *H04N 23/10* (2023.01); *H04N 23/67* (2023.01); *B60R 11/04* (2013.01); *B60R 2011/0003* (2013.01)

(58) Field of Classification Search
CPC ...... H04N 23/667; H04N 23/67; H04N 23/60; H04N 23/10; G06V 20/56; G06V 20/59; G06V 40/16
See application file for complete search history.

(56) References Cited

U.S. PATENT DOCUMENTS

| | | | |
|---|---|---|---|
| 2017/0293198 A1* | 10/2017 | Kim | B62D 15/029 |
| 2020/0404147 A1* | 12/2020 | Kadomae | H04N 5/33 |
| 2022/0377275 A1* | 11/2022 | Miyatani | H04N 25/778 |

FOREIGN PATENT DOCUMENTS

| | | | |
|---|---|---|---|
| JP | 2017-105431 A | | 6/2017 |
| JP | 2019-205078 A | | 11/2019 |
| JP | 2019205078 | * | 11/2019 |
| JP | 2020-205551 A | | 12/2020 |

OTHER PUBLICATIONS

Japanese Office Action for Japanese Patent Application No. 2020-217313 dated Feb. 25, 2022 (partially translated).

* cited by examiner

*Primary Examiner* — Kathleen V Nguyen

(74) *Attorney, Agent, or Firm* — Thomas | Horstemeyer, LLP

(57) ABSTRACT

An imaging apparatus provided inside a vehicle is provided. The imaging apparatus is capable of capturing images with different degrees of sensitivity, and the imaging apparatus captures an image for recognizing an inside of the vehicle with high sensitivity, and captures an image for recognizing an outside of the vehicle with low sensitivity.

10 Claims, 7 Drawing Sheets

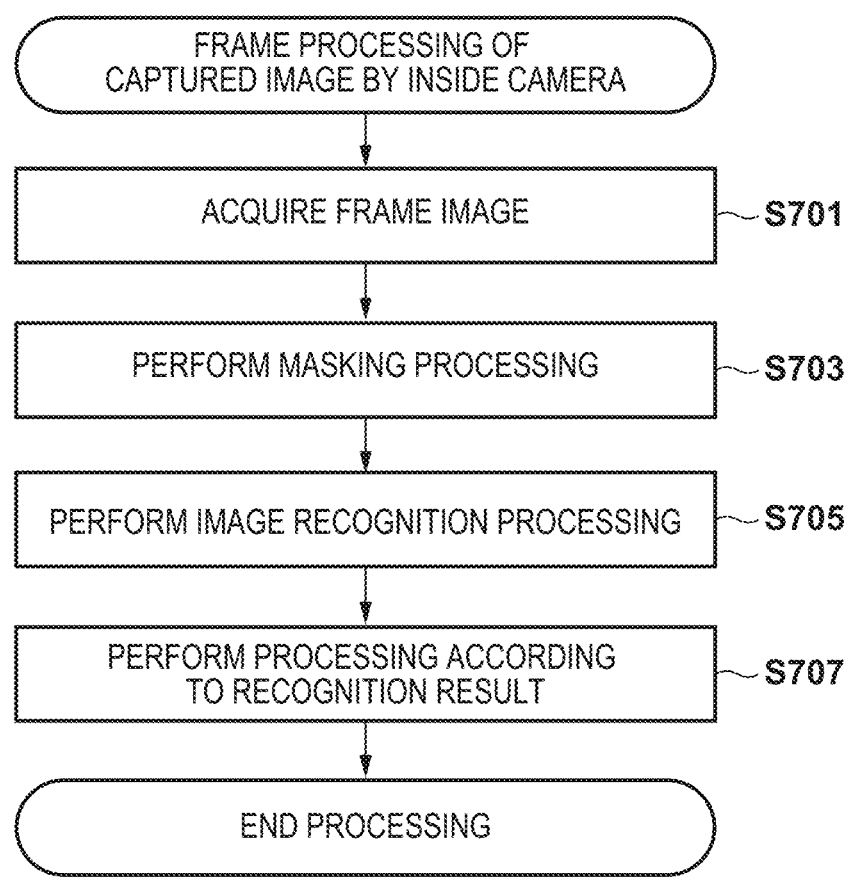

IMAGING APPARATUS

CROSS-REFERENCE TO RELATED APPLICATION(S)

This application claims priority to and the benefit of Japanese Patent Application No. 2020-217313 filed on Dec. 25, 2020, the entire disclosure of which is incorporated herein by reference.

BACKGROUND OF THE INVENTION

Field of the Invention

The present invention relates to an imaging apparatus, and more particularly to an onboard image processing apparatus.

Description of the Related Art

An imaging apparatus for a vehicle has been proposed which captures an image of the inside, surroundings, or the like of the vehicle for the purpose of, for example, managing a driver. As one of such apparatuses, there has been proposed an apparatus that irradiates an object to be imaged with infrared rays from a plurality of infrared light sources and captures an image with an infrared camera (for example, see Japanese Patent Laid-Open No. 2017-105431).

The apparatus described in Japanese Patent Laid-Open No. 2017-105431 is configured such that the brightness of each of the plurality of light sources is separately set so as to reduce variations in brightness for each spot in an image captured by the infrared camera.

The apparatus described in Japanese Patent Laid-Open No. 2017-105431 may reduce variations in brightness only within a range where infrared rays are applied. However, in a case where a subject located outside the irradiation range, such as scenery outside the vehicle, is included in an imaging range, it is difficult to reduce variations in brightness for the subject.

SUMMARY OF THE INVENTION

The present invention provides an imaging apparatus capable of capturing an image of each of the inside and outside of a vehicle with appropriate exposure.

The present invention has the following configuration. That is, provided is an imaging apparatus provided inside a vehicle, wherein the imaging apparatus is capable of capturing images with different degrees of sensitivity, and the imaging apparatus captures an image for recognizing an inside of the vehicle with high sensitivity, and captures an image for recognizing an outside of the vehicle with low sensitivity.

According to the present invention, it is possible to provide an imaging apparatus capable of capturing an image of each of the inside and outside of a vehicle with appropriate exposure.

BRIEF DESCRIPTION OF THE DRAWINGS

FIG. 7 is a flowchart illustrating procedure for imaging and image recognition processing.

DESCRIPTION OF THE EMBODIMENTS

Figure 1A:
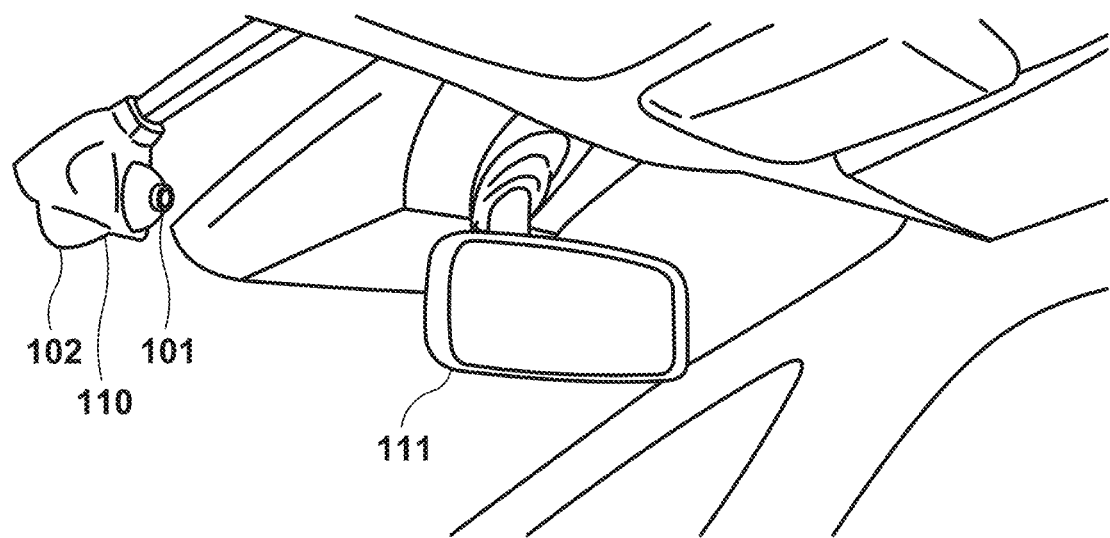
FIGS. 1A and 1B are views of a vehicle to which cameras of a driving recorder according to an embodiment have been attached.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Configuration of Vehicle with Driving Recorder Attached Thereto

Figure 1B:
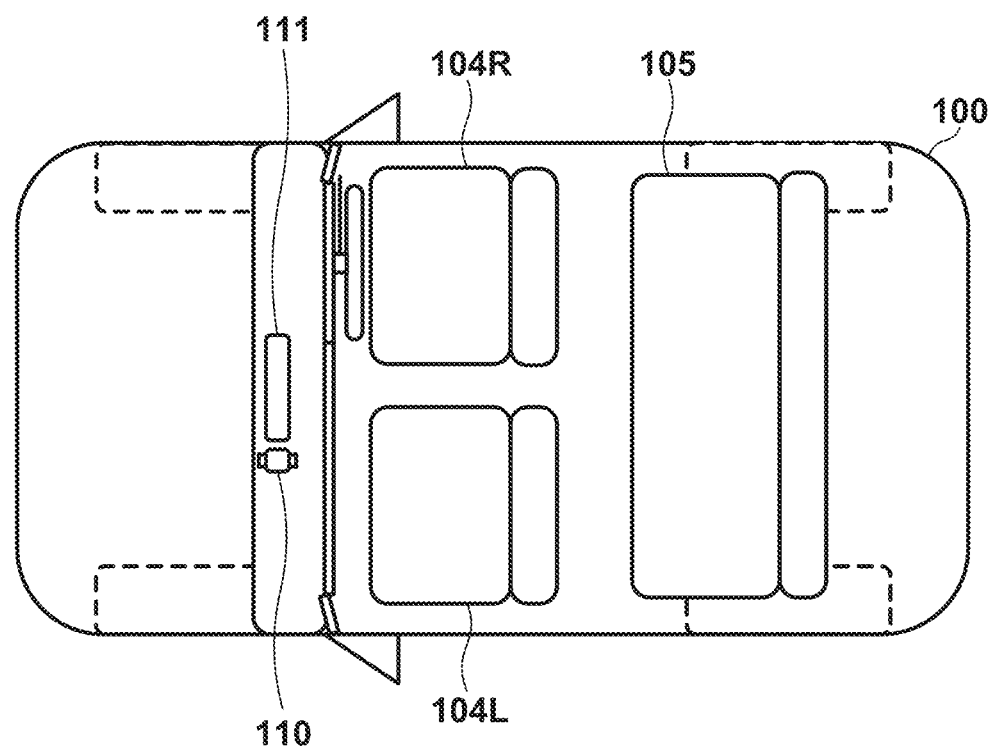

FIGS. 1A and 1B are diagrams illustrating a state in which a driving recorder according to the present embodiment has been attached to a vehicle 100. FIG. 1A illustrates an upper part of a windshield of the vehicle, viewed from the direction of a front seat on the left side. A rearview mirror 111 is provided at the center of the upper part of the windshield. In addition, a camera unit 110 of the driving recorder is provided on the left side thereof. The camera unit 110 includes an inside camera 101 and an outside camera 102. The inside camera 101 is provided in such a way as to face rearward, and captures an image of the inside of the vehicle. The outside camera 102 is provided in such a way as to face forward, and captures an image of a forward view through the windshield of the vehicle. In the present example, the inside camera and the outside camera each have a single lens. The imaging ranges of the inside camera 101 and the outside camera 102 can be independently adjusted. However, since the inside camera 101 employs a wide-angle lens or a fisheye lens, the imaging range may be fixed.

A main body including a control unit may be incorporated in the camera unit 110, or may be provided away from the camera unit 110 and connected to the camera unit 110 by a cable.

FIG. 1B illustrates the vehicle 100 viewed from above through its roof. In this example, the front (forward in the traveling direction) of the vehicle 100 is on the left side of the drawing, and the camera unit 110 is provided on the left side of the rearview mirror 111 when facing forward. A right front seat (also referred to as a driver's seat in the case of a vehicle with a right-hand steering wheel) 104R, a left front seat (also referred to as a passenger seat in the case of a vehicle with a right-hand steering wheel) 104L, and a rear seat 105 are provided in the vehicle 100. A window is provided as a transparent part on each side of the vehicle 100, so that the outside of the vehicle 100 can be observed from the inside of the vehicle 100 through the windows. Note that the windows are made of glass, and function as the transparent parts regardless of whether the windows are open or closed. Furthermore, the inside camera 101 of the camera unit 110 can capture an image of scenery outside the vehicle through the windows together with occupants in the front seats 104R and 104L and the rear seat 105. That is, the captured image includes an image of the inside of the vehicle 100 and an image of the outside of the vehicle 100. Thus, an image is captured such that a moving object such as a vehicle located outside is also included in the image.

Note that the camera unit 110 may be provided on the right side of the rearview mirror 111. However, it is desirable that the imaging range of the inside camera 101 be adjusted such that the optical axis of the lens of the inside camera 101 is along, that is, parallel to a symmetry plane of the windows provided in such a way as to have symmetry with respect to the plane. Furthermore, it is desirable that the camera unit 110 be located as close as possible to the rearview mirror 111. These are to reduce a bilateral difference in speed estimated from images of the outside captured through the left and right windows, due to the deviation of the direction of the camera from the symmetry plane. In this manner, the camera unit 110 is provided in the internal space of the vehicle 100 separated from the outside.

Configuration Example of Driving Recorder

Figure 2:
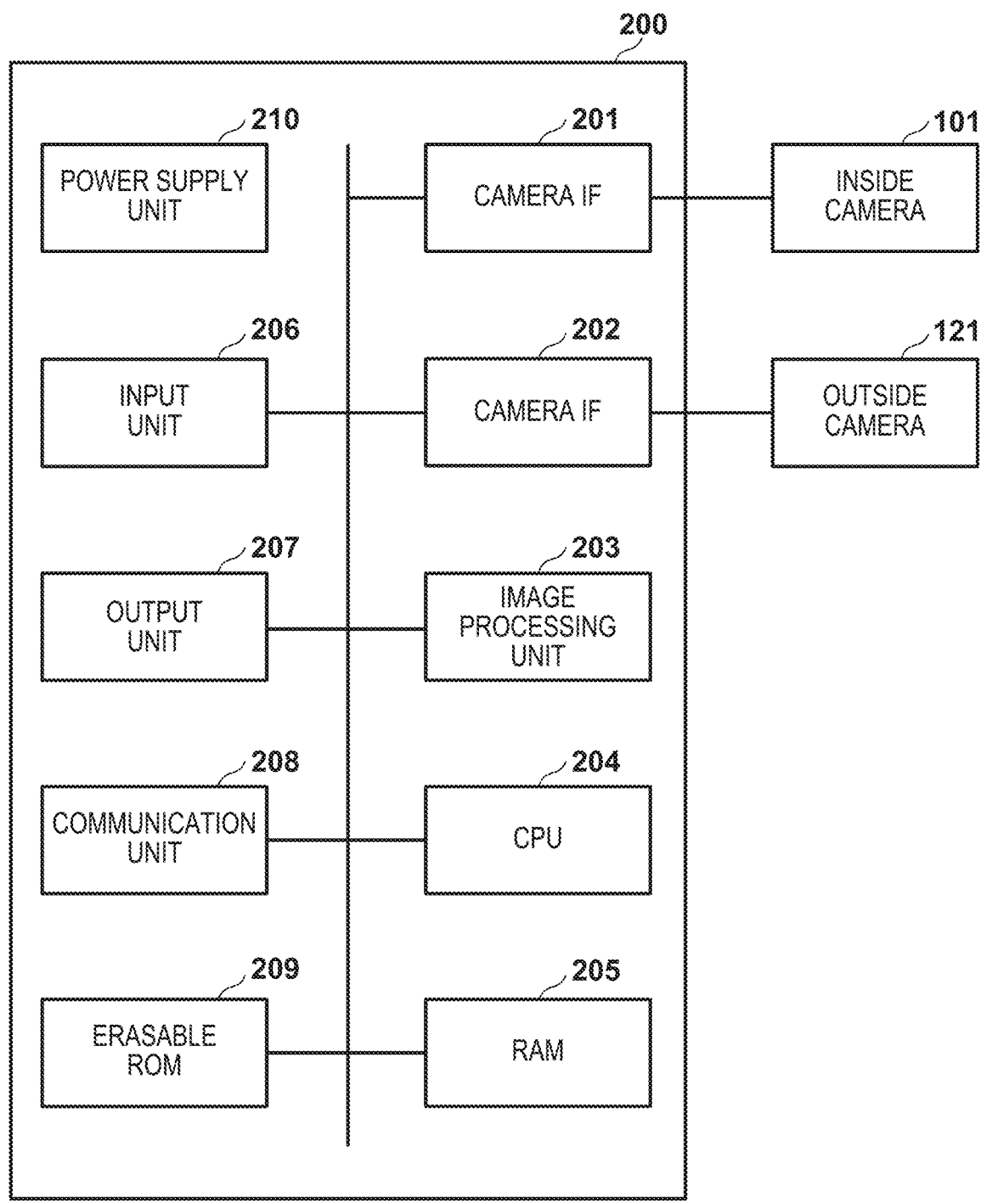
FIG. 2 is a block diagram of a control configuration of the driving recorder according to the embodiment.

FIG. 2 shows an example of a control configuration of the driving recorder according to the embodiment. This driving recorder is retrofitted to the vehicle, and there is no need for an external signal to be input thereto. However, power supply to the driving recorder depends on the vehicle 100. In addition, a device mounted on the vehicle 100 can also be used as a user interface. A configuration and procedure for implementing driving assistance by performing image processing with the driving recorder will be described in the present embodiment. Therefore, the driving recorder may be referred to as an image processing apparatus or a driving assistance apparatus, focusing on this point.

In FIG. 2, the driving recorder includes a control unit 200, the inside camera 101, and the outside camera 102. These cameras, particularly the inside camera 101, may be referred to as an image acquisition unit or the like. Camera interfaces (IFs) 201 and 202 are signal interfaces with the inside camera 101 and the outside camera 102, respectively. Each camera shoots video (captures a moving image) at a predetermined frame rate of, for example, 29 frames per second (fps). The captured image is subjected to image processing by an image processing unit 203, and further subjected to necessary processing by a central processing unit (CPU) 204. Then, the captured image is stored as a video file in an erasable read-only memory (ROM) 209. The video file includes video of a predetermined period of time, for example, about 30 seconds to 60 seconds. When recording for the predetermined period of time is finished, a new video file is recorded. There are at least two video files. When there is no free space in the erasable ROM 209, the oldest video file is erased to secure free space, and a new video file is recorded therein.

In order to function as a driving recorder, the driving recorder also includes an acceleration sensor and the like, and performs control such that, for example, the recording of a video file is stopped when an acceleration exceeding a predetermined value is detected. However, in order to describe the driving recorder by focusing on its driving assistance function, description of the driving recording function thereof and description of the device are omitted in the present embodiment.

A communication unit 208 provides a wire or wireless communication function. For example, in order to output a warning to be described below, the driving recorder may be connected to a smartphone or the like via the communication unit 208 such that a warning is output to the smartphone or the like. Furthermore, as a matter of course, it is also possible to perform communication for other purposes.

An input unit 206 and an output unit 207 are included in an input/output unit as a user interface. The input/output units may each be implemented by, for example, a touch panel included in an operation unit. Alternatively, there may be provided an interface for connecting the driving recorder to a display audio device provided in the vehicle 100. A random access memory (RAM) 205 is used as a data memory necessary for operation of the CPU 204 and the image processing unit 203 and as a memory for storing a program to be executed by the CPU 204. A power supply unit 210 is connected to power supply provided from the vehicle 100, and provides power suitable for the driving recorder.

Control of Sensitivity and Color at Time of Imaging

Figure 3A:
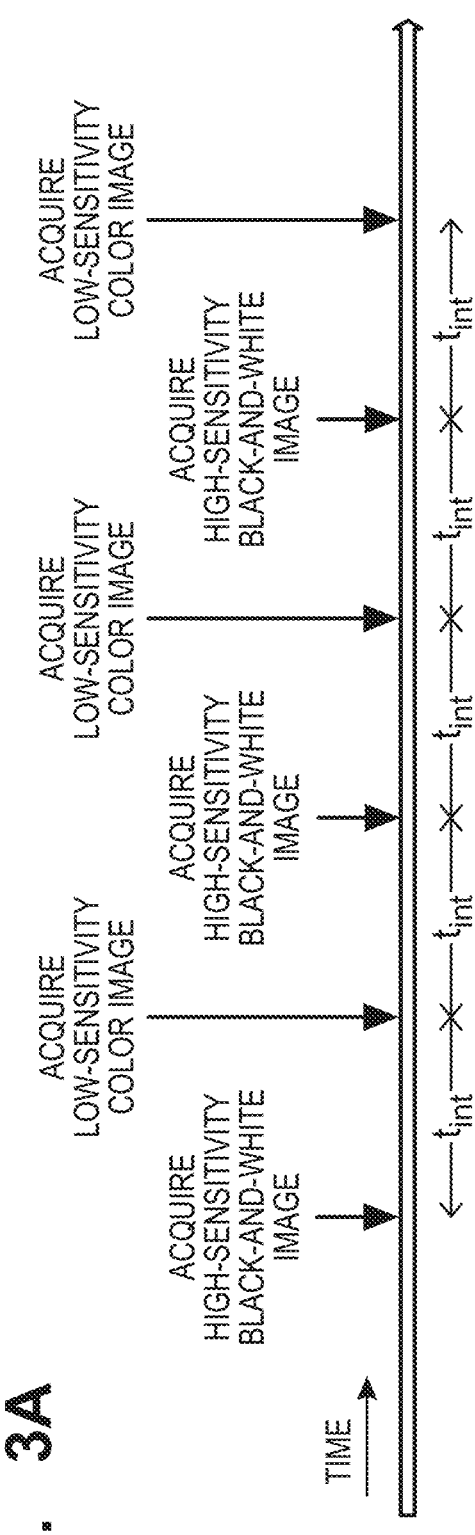
FIGS. 3A and 3B are schematic diagrams illustrating imaging to be performed by an inside camera and image processing, respectively.
Figure 3B:
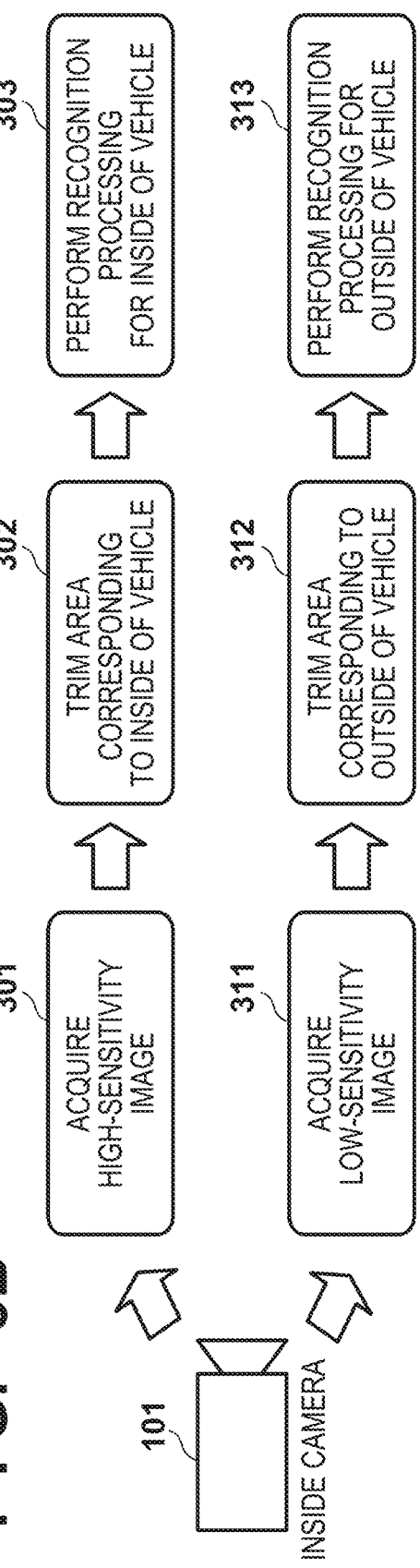

FIGS. 3A and 3B illustrate how sensitivity and color are controlled when imaging is performed by the inside camera 101. While the vehicle is traveling, the inside camera 101 is kept fixed, and captures an image with an angle of view that covers the inside of the vehicle, including the face of a driver, and scenery outside the vehicle viewed through windows provided on the sides and the rear of the vehicle. The inside camera 101 has a function of changing sensitivity from high sensitivity to low sensitivity or vice versa by, for example, adjusting the gain of an imaging element. Sensitivity may be continuously changed. Meanwhile, it is possible to switch between two determined degrees of sensitivity in the present example.

At the time of high-sensitivity imaging, imaging is performed with sensitivity that prevents black crushing in an image of the inside of the vehicle, in particular, the face of the driver, and enables a good image to be captured. Meanwhile, at the time of low-sensitivity imaging, imaging is performed with sensitivity that prevents blown-out highlights of an image of the outside captured through the windows, and enables a good image to be captured. The good image refers to an image that enables identification of a subject to be recognized when image recognition is performed on the image. It is considered that appropriate sensitivity for the inside and outside of the vehicle varies particularly depending on the brightness of the outside of the vehicle. Therefore, for example, at the time of starting an engine, brightness may be measured to determine gain suitable for the brightness for each of the inside of the vehicle and the outside of the windows. Imaging may be performed by use of the gain determined at that time. Furthermore, the brightness may be periodically re-measured to reset the gain. Moreover, the gain may be reset each time imaging is performed with each sensitivity.

In addition, the inside camera 101 has a function of capturing images by switching between color (for example, RGB) imaging and black-and-white (also referred to as monochrome) imaging. For example, the imaging element of the inside camera 101 may be configured as an imaging element intended for color imaging, and the image processing unit 203 may convert a color image into a monochrome image having only a brightness component at the time of capturing a monochrome image. The above-described sensitivity switching and color switching (color or black and white) are performed for each frame of a moving image captured by the inside camera 101. Sensitivity and color may be switched by the control unit 200. Note that an image to be captured by the inside camera 101 may be a still image to be intermittently captured at predetermined intervals, but will be described as a moving image to be captured at a predetermined frame rate in the present example.

FIG. 3A is a diagram illustrating a state in which frames are captured at intervals "tint" on a time-series basis. The inside camera 101 alternately captures (or acquires) a high-sensitivity black-and-white image and a low-sensitivity color image at intervals "tint". Furthermore, focus may be switched at the same timing. When a low-sensitivity color image is captured, a focal distance may be set in such a way as to focus on the outside of the vehicle, such as a point at infinity. When a high-sensitivity monochrome image is captured, the focal distance may be set in such a way as to focus on the inside of the vehicle, such as the face of the driver (for example, about 50 cm).

FIG. 3B schematically illustrates processing of a high-sensitivity black-and-white image and a low-sensitivity color image captured by the inside camera 101. As described above, these images are alternately captured, and when a high-sensitivity black-and-white image is acquired (301), trimming is performed such that an area corresponding to the inside of the vehicle remains (302), and image recognition processing is performed on the remaining image area (303). The image captured with high sensitivity includes a scene of the inside of the vehicle, the image quality of which is particularly good. Therefore, it is possible to improve the accuracy of recognizing the inside of the vehicle, for example, the face of an occupant. In particular, an area that is assumed to include the face of the driver is a target of recognition. When the face is recognized, the video shot by the outside camera 102 may be stored in association with the driver after the face is checked against, for example, a registered feature database to identify the driver. It is also possible to further recognize eyes from a face area, and to determine the line of sight particularly from the positions of pupils. Here, when it is determined that the line of sight is not directed forward over, for example, a predetermined number of frames, an audio warning or the like may be output to the driver. In addition, the face of an occupant other than the driver may be recognized and recorded as the occupant if the face can be identified.

Meanwhile, when a low-sensitivity color image is acquired (311), trimming is performed such that a window portion, that is, a scene of the outside of the vehicle remains (312), and image recognition processing is performed on the remaining image area (313). The image captured with low sensitivity includes a scene of the outside of the vehicle, the image quality of which is particularly good. Therefore, it is possible to improve the accuracy of recognizing targets located outside the vehicle, such as road facilities and buildings, viewed through the windows. When a target is recognized, it is possible to, for example, estimate the speed of the vehicle 100 on which the camera unit 110 has been mounted by determining the distance to the target on the basis of, for example, the estimated size of the target and the target's position in the image over a plurality of frames. In this way, it is possible to acquire both low-sensitivity images and high-sensitivity images in a large amount in a short time by alternately capturing a low-sensitivity image and a high-sensitivity image. Therefore, it is also possible to perform image analysis such as analysis regarding the driver and motion analysis between frames of a low-sensitivity image and between frames of a high-sensitivity image.

Figure 4A:
FIGS. 4A and 4B are diagrams showing examples of a captured image and an image of an object to be recognized.
Figure 4B:
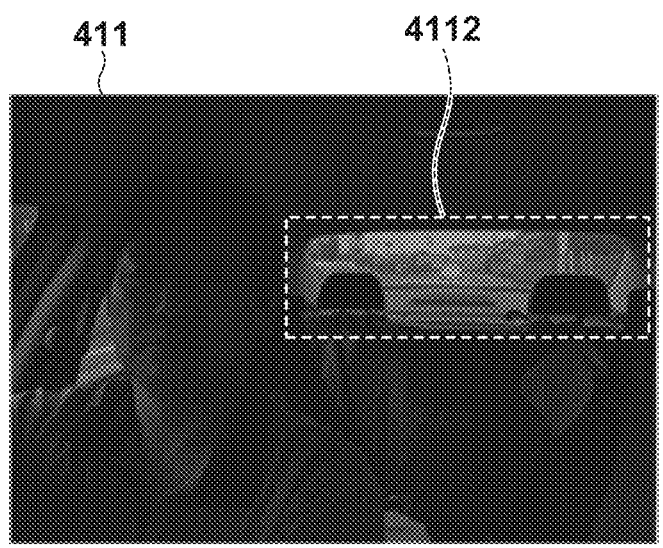

FIGS. 4A and 4B show examples of a captured image and an area to be recognized. An image 401 in FIG. 4A is an example of an image captured in black and white with high sensitivity. The image 401 has been captured with image quality that enables image recognition of the inside of the vehicle 100 to be performed in a favorable manner. Here, image recognition processing, in particular, recognition processing of a face area is performed particularly on an area 4012 including the driver's face. For example, after the entire image is searched for a facial contour, an area including the relevant contour may be designated as the area 4012 on which image recognition processing is to be performed. Alternatively, an area where the driver's face is located may be set in advance when the inside camera 101 is installed.

Meanwhile, an image 411 in FIG. 4B is an example of an image captured in color with low sensitivity. The scene of the outside of the vehicle 100, viewed through the window, has been captured with image quality that enables image recognition of the scene to be performed in a favorable manner. Here, image recognition processing, in particular, recognition processing of facilities, buildings, and the like around roads is performed particularly on an area 4112 including the window portion. Although not illustrated here, image recognition may also be performed on a window on a side of the vehicle. For example, after the entire image is searched for an area with high lightness, the relevant area may be designated as the area 4112 on which image recognition processing is to be performed. Alternatively, an area where the window is located may be set when the inside camera 101 is installed.

Example of Processing Procedure

Figure 5:
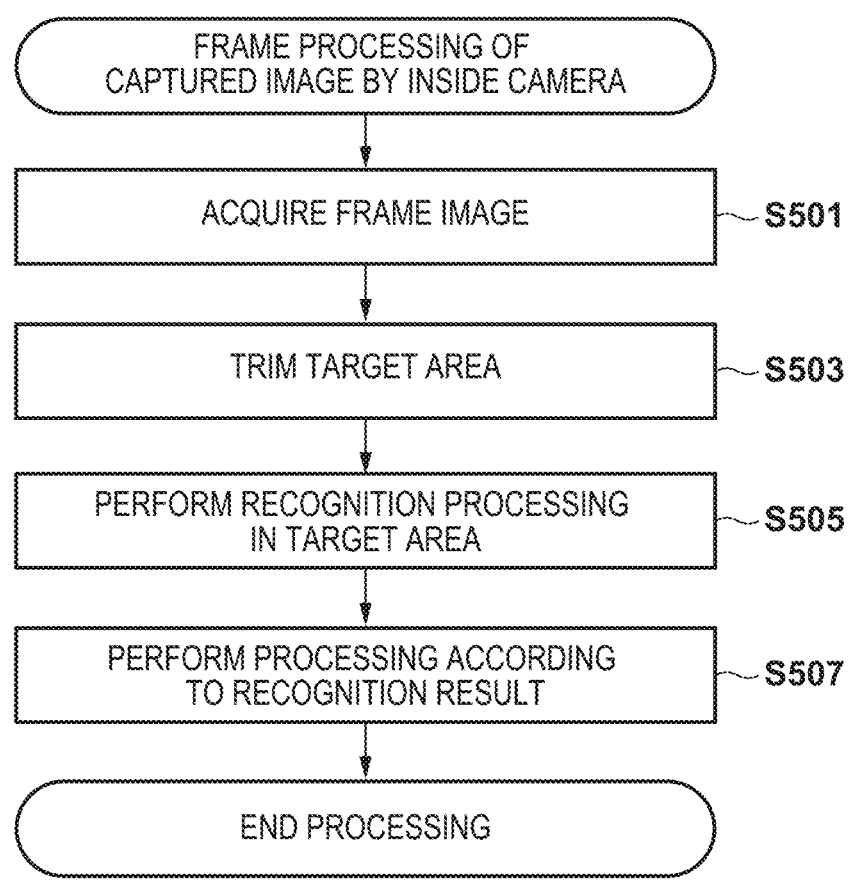
FIG. 5 is a flowchart illustrating procedure for imaging and image recognition processing.

FIG. 5 is a flowchart illustrating procedure for processing of a captured image (frame) to be performed by, for example, the CPU 204. The procedure of FIG. 5 may be executed when each frame is captured. First, a captured frame image is acquired (S501). Then, trimming is performed on the acquired image as illustrated in FIGS. 4A and 4B (S503). Note that, here, trimming is performed such that the inside of the vehicle including the face area remains in the case of a high-sensitivity monochrome image, and such that the window including the outside of the vehicle remains in the case of a low-sensitivity color image. For example, whether an image corresponds to a high-sensitivity monochrome image or a low-sensitivity color image may be determined on the basis of the timing of capturing the image as illustrated in FIG. 3A. Once which of a high-sensitivity black-and-white image or a low-sensitivity color image is processed first is determined, a high-sensitivity black-and-white image and a low-sensitivity color image alternately appear, starting from the image that is processed first. Therefore, it is possible to determine which of a high-sensitivity black-and-white image or a low-sensitivity color image is processed, on the basis of the timing of capturing an image. Next, image recognition processing is performed on an area that has remained as a result of the trimming (S505). The recognition processing is also performed in such a way as to recognize a face or a target located outside the vehicle according to the type of the image. After the image recognition is performed, monitoring of the driver, driving assistance suitable for the target located outside the vehicle, or the like is performed according to a recognition result (S507).

Note that while the image is trimmed in this embodiment, the image recognition processing may be performed on a limited area without performing trimming.

As described above, according to the present embodiment, in a case where an image of the inside of the vehicle is captured by a single onboard camera, and image recognition is performed on the captured image so as to recognize the inside and outside of the vehicle, appropriate exposure can be set for both the inside and outside of the vehicle, so that a good image recognition result can be obtained. Furthermore, since high dynamic range (HDR) rendering processing for combining a low-sensitivity image and a high-sensitivity image is not performed, an image processing load can be reduced.

Other Embodiments

Next, a process of performing masking instead of trimming will be described. In the present embodiment, masking is performed instead of the trimming to be performed in 302 and 312 of FIG. 3B. In this example, since an area that is not a recognition target is masked, recognition processing may be performed on an entire captured image.

Figure 6A:
FIGS. 6A and 6B are diagrams showing examples of a captured image and an image of an object to be recognized.
Figure 6A:
Figure 6A:
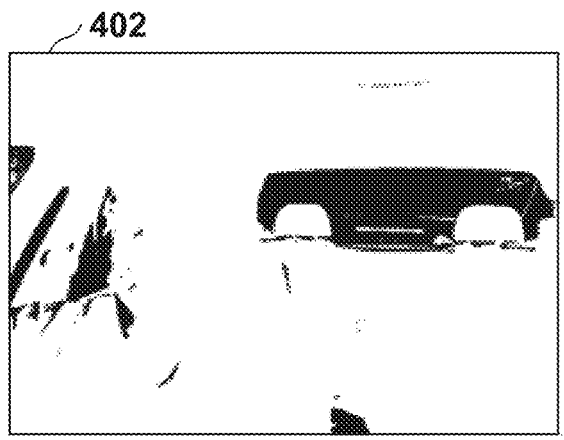
Figure 6A:
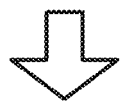
Figure 6A:
Figure 6B:
Figure 6B:
Figure 6B:
Figure 6B:
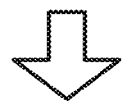
Figure 6B:

FIGS. 6A and 6B are diagrams showing examples of image processing in the present example. In addition, FIG. 7 is a flowchart illustrating image processing procedure in the present example. When a high-sensitivity black-and-white image 401 or a low-sensitivity color image 411 is acquired (S701), masking processing is performed (S703). A mask image may be created in advance according to the angle of view of a fixed camera, or may be created by image processing. A mask image 402 in FIG. 6A is, for example, an image obtained by binarization of the high-sensitivity black-and-white image 401 with a predetermined pixel value as a threshold value and inversion of the binarized image. Masking processing is performed by use of the mask image 402. As a result, an image 403 is obtained. An area corresponding to the outside of the vehicle, viewed through a window has been masked. Meanwhile, a mask image 412 in FIG. 6B is, for example, a mask image created by binarization of the high-sensitivity black-and-white image 401 with a predetermined pixel value as a threshold value. Masking processing is performed on the low-sensitivity color image 411 by use of the mask image 412. As a result, an image 413 is obtained. An area corresponding to the inside of the vehicle has been masked.

Here, which type of image is to be processed may be determined at, for example, the timing of capturing an image as illustrated in FIG. 3A. Once which of a high-sensitivity black-and-white image or a low-sensitivity color image is processed first is determined, a high-sensitivity black-and-white image and a low-sensitivity color image alternately appear, starting from the image that is processed first. Next, image recognition processing is performed on the masked image (S705). The recognition processing is also performed in such a way as to recognize a face or a target located outside the vehicle according to the type of the image. After the image recognition is performed, monitoring of the driver, driving assistance suitable for the target located outside the vehicle, or the like is performed according to a recognition result (S707).

As described above, according to the present embodiment, in a case where an image of the inside of the vehicle is captured by a single onboard camera, and image recognition is performed on the captured image so as to recognize the inside and outside of the vehicle, appropriate exposure can be set for both the inside and outside of the vehicle, so that a good image recognition result can be obtained. Furthermore, since high dynamic range (HDR) rendering processing for combining a low-sensitivity image and a high-sensitivity image is not performed, an image processing load can be reduced. Furthermore, as a result of performing masking processing suitable for each of a low-sensitivity image and a high-sensitivity image, it is possible to implement appropriate image recognition by excluding an area on which image recognition is not to be performed.

Summary of Embodiments

The above-described embodiments are summarized as follows.

According to a first aspect of the present invention, there is provided an imaging apparatus provided inside a vehicle, wherein the imaging apparatus is capable of capturing images with different degrees of sensitivity, and the imaging apparatus captures an image for recognizing an inside of the vehicle with high sensitivity, and captures an image for recognizing an outside of the vehicle with low sensitivity.

With this configuration, an image can be captured with exposure suitable for each of the inside and outside of the vehicle.

According to a second aspect of the present invention, there is provided an imaging apparatus that alternately performs low-sensitivity imaging and high-sensitivity imaging, in addition to the first aspect.

With this configuration, each of a low-sensitivity image and a high-sensitivity image can be acquired in a short time.

According to a third aspect of the present invention, there is provided an imaging apparatus in which, in addition to the first or second aspect, a focus setting differs between low-sensitivity imaging and high-sensitivity imaging.

With this configuration, it is possible to acquire an image with a focus suitable for an object to be imaged.

According to a fourth aspect of the present invention, there is provided an imaging apparatus in which, in addition to the third aspect, a focal distance is set in such a way as to focus on the outside of the vehicle when low-sensitivity imaging is performed, and the focal distance is set in such a way as to focus on the inside of the vehicle when high-sensitivity imaging is performed.

With this configuration, it is possible to acquire an image of the outside of the vehicle with low sensitivity and an image of the inside of the vehicle with high sensitivity in a particularly favorable condition.

According to a fifth aspect of the present invention, there is provided an imaging apparatus in which, in addition to the first to fourth aspects, a color setting differs between low-sensitivity imaging and high-sensitivity imaging.

With this configuration, an image can be acquired in color suitable for the use of a low-sensitivity image and a high-sensitivity image.

According to a sixth aspect of the present invention, there is provided an imaging apparatus in which, in addition to the fifth aspect, a setting is made in such a way as to use color for color imaging when low-sensitivity imaging is performed, and a setting is made in such a way as to use color for monochrome imaging when high-sensitivity imaging is performed.

With this configuration, a low-sensitivity image can be acquired in color in which an object located outside the vehicle can be easily recognized, and a high-sensitivity image can be acquired as a monochrome from which a color component has been omitted.

According to a seventh aspect of the present invention, there is provided an imaging apparatus in which, in addition to the first to sixth aspects, image recognition is to be performed on a window portion provided in the vehicle when low-sensitivity imaging is performed, and image recognition is to be performed on a face of a driver in the vehicle when high-sensitivity imaging is performed.

With this configuration, the outside of the vehicle can be recognized from a low-sensitivity image, and the driver's face can be recognized from a high-sensitivity image.

According to an eighth aspect of the present invention, there is provided an imaging apparatus in which, in addition to the seventh aspect, the imaging apparatus performs image recognition by masking the inside of the vehicle except for the window portion provided in the vehicle when performing low-sensitivity imaging, and performs image recognition by masking the window portion when performing high-sensitivity imaging.

With this configuration, it is possible to perform image recognition on a necessary area after masking an unnecessary area.

The invention is not limited to the foregoing embodiments, and various variations/changes are possible within the spirit of the invention.

What is claimed is:

1. An imaging apparatus provided inside a vehicle, comprising:
   an image capturing unit that is capable of capturing images with different degrees of sensitivity and capable of switching color setting between color imaging for capturing color images and monochrome imaging for capturing monochrome images; and
   a controller having at least one processor and at least one memory in which at least one program is stored,
   wherein the at least one program causes the imaging apparatus when executed by the at least one processor to capture an image for recognizing an inside of the vehicle with high sensitivity, and captures an image for recognizing an outside of the vehicle with low sensitivity,
   wherein the color setting is set to color imaging when low-sensitivity imaging is performed for recognition of an image outside the vehicle, and the color setting is set to monochrome imaging when high-sensitivity imaging is performed for recognition of an image inside the vehicle, and
   wherein, at the time of high-sensitivity imaging, imaging is performed with sensitivity that prevents black crushing in an image of the inside of the vehicle, and at the time of low-sensitivity imaging, imaging is performed with sensitivity that prevents blown-out highlights of an image of the outside the vehicle.

2. The imaging apparatus according to claim 1, wherein the imaging apparatus alternately performs low-sensitivity imaging and high-sensitivity imaging.

3. The imaging apparatus according to claim 1, wherein a focus setting differs between low-sensitivity imaging and high-sensitivity imaging.

4. The imaging apparatus according to claim 3, wherein the focus setting is set in such a way as to focus on the outside of the vehicle when low-sensitivity imaging is performed, and the focus setting is set in such a way as to focus on the inside of the vehicle when high-sensitivity imaging is performed.

5. The imaging apparatus according to claim 1, wherein image recognition is to be performed on a window portion provided in the vehicle when low-sensitivity imaging is performed, and image recognition is to be performed on a face of a driver in the vehicle when high-sensitivity imaging is performed.

6. The imaging apparatus according to claim 5, wherein the imaging apparatus performs image recognition by masking the inside of the vehicle except for the window portion provided in the vehicle when performing low-sensitivity imaging, and performs image recognition by masking the window portion when performing high-sensitivity imaging.

7. The imaging apparatus according to claim 6, wherein the imaging apparatus performs masking the image imaged by the high sensitivity imaging with a mask obtained by binarizing an image imaged by the high sensitivity imaging and inverting the binarized image when recognizing the image imaged by the high sensitivity imaging, and
   the imaging apparatus performs masking the image imaged by the low sensitivity imaging with a mask obtained by binarizing an image imaged by the high sensitivity imaging when recognizing the image imaged by the low sensitivity imaging.

8. The imaging apparatus according to claim 1, wherein the imaging apparatus captures a moving image with an angle of view that covers the inside of the vehicle and the outside of the vehicle, viewed through a window portion provided in the vehicle by switching between the different degrees of sensitivity for each frame.

9. The imaging apparatus according to claim 1, wherein the imaging apparatus alternately captures the image for recognizing the inside of the vehicle and the image for recognizing the outside of the vehicle at predetermined time intervals.

10. An imaging apparatus provided inside a vehicle, comprising:
    an image capturing unit that is capable of capturing images with different degrees of sensitivity and capable of switching color setting between color imaging for capturing color images and monochrome imaging for capturing monochrome images, and
    a controller having at least one processor and at least one memory in which at least one program is stored,
    wherein the at least one program causes the imaging apparatus when executed by the at least one processor to capture an image for recognizing an inside of the vehicle with high sensitivity, and captures an image for recognizing an outside of the vehicle with low sensitivity,
    wherein the imaging apparatus performs image recognition by masking the inside of the vehicle except for the window portion provided in the vehicle when performing low-sensitivity imaging, and performs image recognition by masking the window portion when performing high-sensitivity imaging, and
    wherein the imaging apparatus performs masking the image imaged by the high sensitivity imaging with a mask obtained by binarizing an image imaged by the high sensitivity imaging and inverting the binarized image when recognizing the image imaged by the high sensitivity imaging, and
    the imaging apparatus performs masking the image imaged by the low sensitivity imaging with a mask obtained by binarizing an image imaged by the high sensitivity imaging when recognizing the image imaged by the low sensitivity imaging, and
    wherein, at the time of high-sensitivity imaging, imaging is performed with sensitivity that prevents black crushing in an image of the inside of the vehicle, and at the time of low-sensitivity imaging, imaging is performed with sensitivity that prevents blown-out highlights of an image of the outside the vehicle.

\* \* \* \* \*